US006183388B1

(12) United States Patent
Hawkins

(10) Patent No.: US 6,183,388 B1
(45) Date of Patent: Feb. 6, 2001

(54) EPICYCLIC FACE GEAR REDUCTION GEARBOX PARTICULARLY FOR A GAS TURBINE ENGINE

(75) Inventor: John M. Hawkins, Greenwood, IN (US)

(73) Assignee: Allison Engine Company, Inc., Indianapolis, IN (US)

( * ) Notice: Under 35 U.S.C. 154(b), the term of this patent shall be extended for 0 days.

(21) Appl. No.: 08/614,238

(22) Filed: Mar. 12, 1996

(51) Int. Cl.[7] .................................................... F16H 1/30
(52) U.S. Cl. ............................ 475/336; 74/410; 74/416; 475/338
(58) Field of Search .................... 74/416, 417, 423, 74/424, 665 C, 665 H, 665 K, 410, 411; 475/336, 338, 341, 339, 346

(56) References Cited

U.S. PATENT DOCUMENTS

| | | | |
|---|---|---|---|
| 798,907 | * | 9/1905 | Knudsen ................................ 74/410 |
| 1,195,119 | * | 8/1916 | Westinghouse ....................... 74/410 |
| 2,270,567 | | 1/1942 | Slider . |
| 2,313,183 | * | 3/1943 | Trbojevich ........................... 475/335 |
| 2,908,187 | * | 10/1959 | Saari .................................. 74/665 K |
| 2,924,998 | * | 2/1960 | Sem et al. ............................. 475/336 |
| 2,951,395 | * | 9/1960 | Smith et al. ........................... 74/423 |
| 3,129,608 | * | 4/1964 | Watson .............................. 74/665 C |
| 3,382,838 | * | 5/1968 | Bergstedt ............................... 74/417 |
| 3,871,248 | * | 3/1975 | Barish .................................... 74/410 |
| 4,043,216 | * | 8/1977 | Steer ...................................... 74/410 |
| 4,068,470 | * | 1/1978 | Sargisson et al. ...................... 74/417 |
| 4,251,987 | | 2/1981 | Adamson . |
| 4,486,051 | * | 12/1984 | Becker .................................. 74/425 |
| 4,983,153 | * | 1/1991 | Luijten .................................. 74/416 |
| 5,114,287 | * | 5/1992 | Ervay et al. .......................... 409/13 |
| 5,178,028 | * | 1/1993 | Bossler, Jr. ........................... 74/416 |
| 5,233,886 | * | 8/1993 | Bossler, Jr. ........................... 74/416 |
| 5,247,856 | | 9/1993 | Cuypers . |
| 5,472,385 | | 12/1995 | Vu . |

FOREIGN PATENT DOCUMENTS

| | | |
|---|---|---|
| 652043 | 3/1929 | (FR) . |
| WO 92 18279 | 10/1992 | (WO) . |

OTHER PUBLICATIONS

Bent, RD. and McKinley, J.L. "Turboprop and Turboshaft Engines." in: *Aircraft Powerplants* (New York, Gregg, Division McGraw–Hill Book Company, 1985), pp. 520, 541–542.TL701N6.*
Patent Abstracts of Japan, vol. 008, No. 040 (M–278), Feb. 21, 1984 and JP 58 196348 A (Asumo KK), Nov. 15, 1983.

* cited by examiner

*Primary Examiner*—Sherry L. Estremsky
(74) *Attorney, Agent, or Firm*—Woodard, Emhardt, Naughton, Moriarty & McNett

(57) ABSTRACT

A gear reduction gearbox connected to a gas turbine engine to reduce the shaft speed and increase the output torque. In one form of the present invention an input shaft and an output shaft are rotatable within a mechanical housing. A face gear set connects between the shafts for changing the speed of the output shaft relative to the input shaft. The present invention, in one embodiment includes load sharing wherein a plurality of pinion gear assemblies distribute the load transmitted through the gearbox.

89 Claims, 8 Drawing Sheets

EPICYCLIC FACE GEAR REDUCTION GEARBOX PARTICULARLY FOR A GAS TURBINE ENGINE

BACKGROUND OF THE INVENTION

The present invention relates generally to the design and construction of a gear reduction gearbox for a gas turbine engine. More particularly, the present invention has one embodiment wherein the gear reduction gearbox utilizes an epicyclic face gear drive unit connected to a gas turbine engine to reduce shaft speed and increase the output torque. Although the present invention was developed for use in a gas turbine engine, certain applications may be outside of this field.

Gas turbine engine designers generally integrate a gear reduction gearbox with the engine in order to reduce the output shaft speed, and increase the torque delivered to an output device, such as a fan. It is well known that gas turbine engines are high speed rotary equipment having components including an output shaft revolving at speeds from about 5,000 to 50,000 revolutions per minute. Sometimes, in order to harness the power from the output shaft of the gas turbine engine a main gear reduction gearbox is coupled to the engine to decrease shaft rotation speed and increase output torque. Main gear reduction gearboxes include gear sets therein for reducing the shaft speed during the transmission of power from the gas turbine engine to the output devices, such as a fan. The transmission of power from the gas turbine engine to the output device imparts substantial loads on the bearings and gears of the gearbox.

Historically, designers of main gear reduction gearboxes for gas turbine engines have relied upon multi-stage reduction gearboxes not having bevel gear sets. A limitation associated with bevel gear sets is the inability to efficiently share the load transmitted through the gearbox. Absent load sharing within the gearbox there is an increase in stress on the individual gear and the bearing associated with the gear, therefore often requiring an increase in the bearing and gear size. The technological difficulties associated with load sharing in bevel gear drives stems directly from having to precisely align the mating gears of the set, and therefore the use of multiple pinion gears on a common shaft can create conflicts in alignment. Alignment conflicts serve to increase the complexity of manufacturing and servicing the gearbox.

The application of gas turbine engines as a propulsion means for an aircraft often creates design parameter conflicts, such as the need for a durable long life gear train and the necessity to minimize the volume and weight of the respective engine. Prior designers of gas turbine engine gear reduction gearboxes have generally used multi-stage gearboxes to effectuate significant shaft speed reduction. One common limitation associated with bevel gear sets is that their gear reduction ratio is below 8:1 due to manufacturing constraints. Therefore in order to obtain a higher gear reduction ratio involves adding additional stages that add weight, unit manufacturing costs, and often complicates construction and causes alignment problems between gear sets.

Apart from kinematic limitations associated with bevel gear sets there are additional constraints that designers of gear reduction gearboxes must address. One additional constraint is that bevel gear sets require precision alignment in the axial and radial direction. The alignment precision between the pinion and meshing gear often creates assembly difficulties, thereby increasing the cost to manufacture and service the gearbox. Further, the precision alignment parameter often limits the designers flexibility in gear set arrangements.

In many gas turbine engine gear reduction gearboxes the individual gears are not stress limited, but in reality the bearings are the limiting factor due to fatigue failure. Thus, in many prior gear reduction gearbox designs the bearing fatigue life dictates increasing the size of the bearing, which thereby increased the gear size. Further, many prior gearbox designs must fit within a prespecified volume and the utilization of bevel gear arrangements often precludes using larger bearings because of their impact on volume, thereby limiting the service life of the components.

Even with the variety of prior gas turbine gear reduction gearboxes there remains a need for an improved gear reduction gearbox. The present invention satisfies this need in a novel and unobvious way.

SUMMARY OF THE INVENTION

One form of the present invention contemplates an internal combustion engine and a gearbox connected to the engine, comprising: a mechanical housing; an input shaft rotatable within the housing; an output shaft rotatable within the housing; and a face gear for changing the speed of the output shaft relative to the input shaft, the face gear positioned within the housing and transverse to the input and the output shafts.

One object of the present invention is to provide an improved gear reduction gearbox for a gas turbine engine.

Related objects and advantages of the present invention will be apparent from the following description.

DESCRIPTION OF THE PREFERRED EMBODIMENT

Figure 1:
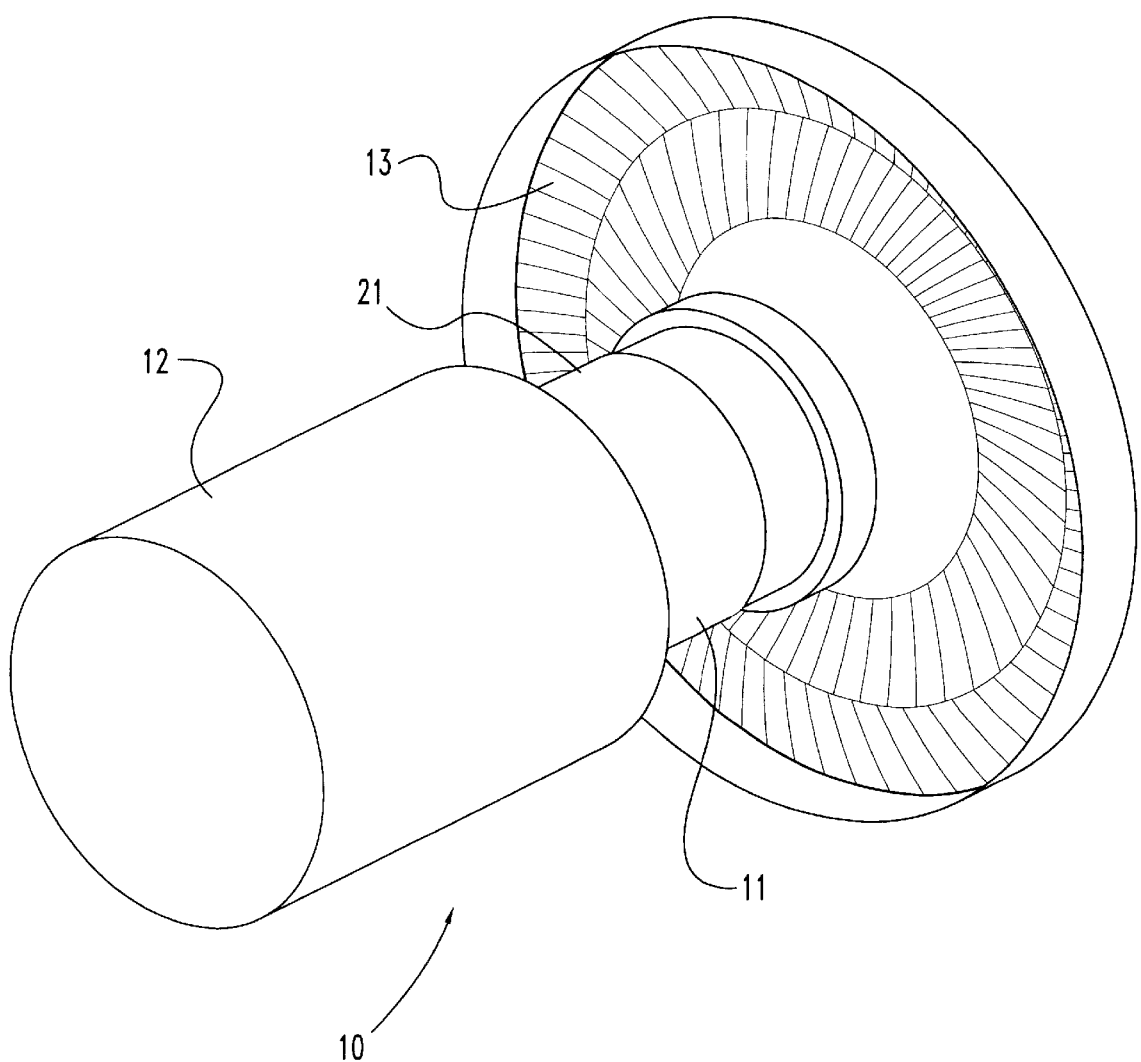
FIG. 1 is an illustrative view of a gas turbine engine having a gear reduction gearbox according to one form of the present invention being coupled to a propulsion fan.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an internal combustion engine 10. In the preferred embodiment the internal combustion engine is an aircraft flight propulsion engine. It is understood that an aircraft is generic and includes helicopters, tactical fighters, trainers, missiles and other related apparatuses. In the preferred embodiment the flight propulsion engine 10 defines a gas turbine engine 12 including a compressor, a combustor, and a power turbine. It is important to realize that there are a multitude of ways in which the components can be linked together. Additional compressors and turbines could be added with intercoolers connected between the compressors and reheat combustion chambers could be added between the turbines. Further, a gas turbine engine is equally suited to be used for industrial applications. Historically, there has been wide spread use of industrial gas turbine engines, such as pumping sets for gas and oil transmission lines, electricity generation and naval propulsion.

A mechanical gear reduction gearbox 11 is coupled to an output shaft (not illustrated) of the gas turbine engine 12. It is preferred that the gearbox transmit a minimum of about fifty shaft horsepower therethrough. A typical output shaft speed of many gas turbine engines is in the range of about 5,000 to 50,000 revolutions per minute. Therefore it is often necessary to connect the output shaft of the gas turbine engine 12 to a gear reduction gearbox 11 in order to reduce the rotational speed transmitted to a motive power device 13. In one form of the present invention motive power device 13 is connected to the output shaft of the gearbox 11. The motive power device 13 can be a propeller, a fan, or such other devices that function to impart energy from the gas turbine engine 12 to the surrounding environment to facilitate propulsion of the aircraft.

Figure 2:
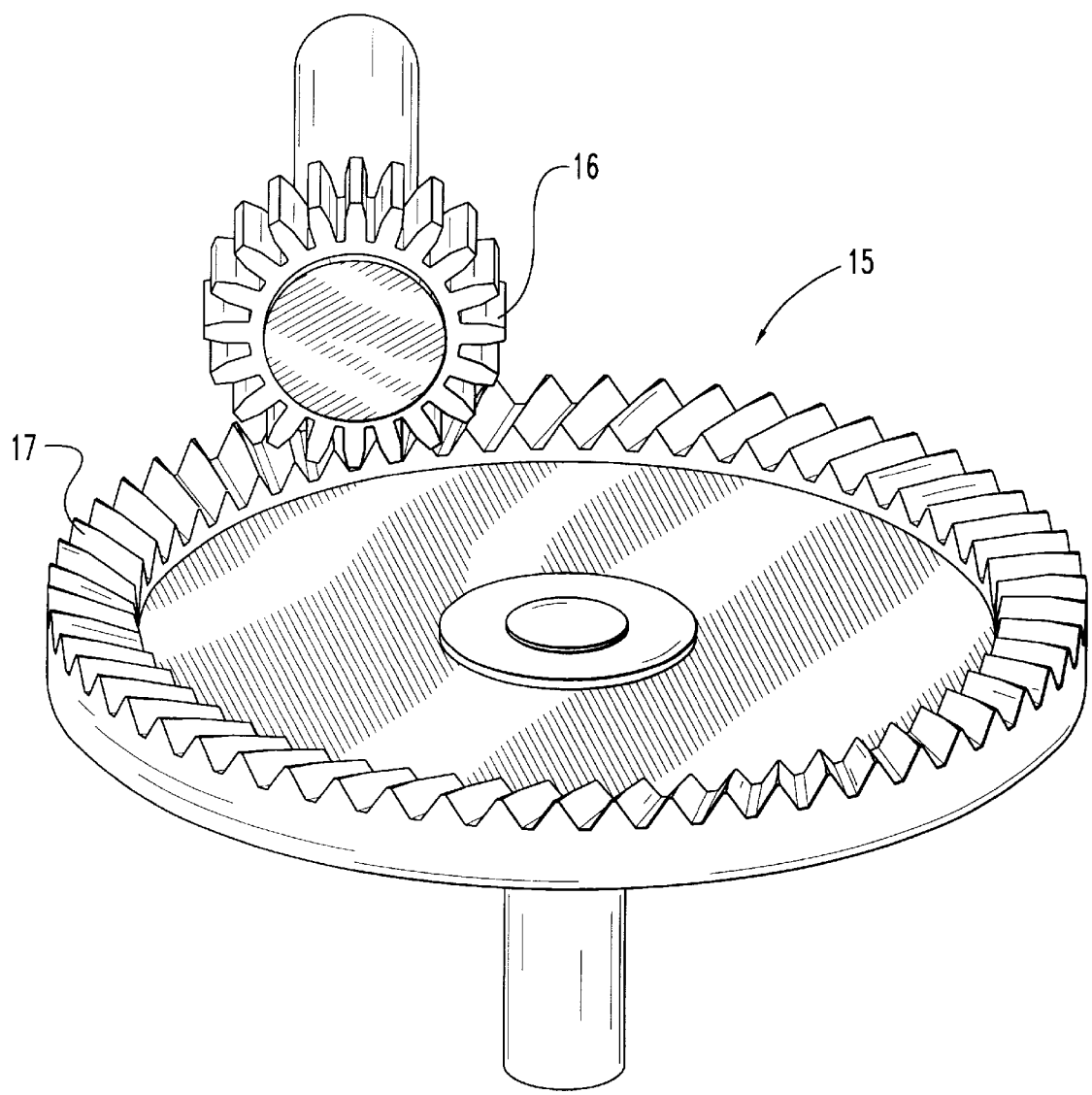
FIG. 2 is a perspective view of a typical face gear set that can comprise a portion of a gear reduction gearbox.

With reference to FIG. 2, there is illustrated a typical face gear set 15, (contrate gear pair). The face gear set 15 illustrated in FIG. 2, is not intended to be limiting but rather is intended to facilitate a further understanding of the present invention. In one embodiment of gear reduction gearbox 11 there is utilized at least one face gear set to transmit power from the gas turbine engine 12 to the motive power device 13. A typical face gear set 15 is comprised of a pinion gear 16 (cylindrical gear) that meshes with a face gear 17 (contrate gear). It is preferred that the pinion gear of the set is a spur or helical gear that is not substantially different from their parallel axis counterpart except for the fact that it meshes with a face gear. Face gears generally have teeth that are formed such that the axis of the teeth lie in a plane perpendicular to the shaft axis. It is contemplated herein that an alternate embodiment of the present invention includes a face gear having teeth positioned in a plane at a taper angle relative to the shaft axis. Further, the face gear tooth generally changes shape from one end of the tooth to the other.

Individuals having ordinary skill in the art will be generally familiar with face gears, and a relatively recent manufacturing improvement by Crown Gear B.V., of Holland has enabled the manufacturing of a more cost efficient, high capacity, high accuracy face gear set. The process utilized by Crown Gears B.V., allows for the finishing of hardened face gears through skiving. The resulting face gear sets are precision high capacity gears having hardened surfaces. In one form of the present invention the face gear sets are surfaced hardened to a range of about Rockwell C 58–62. Surface hardness is very desirable necessary in a gas turbine engine gearbox to withstand the high pitch line velocity and loads transmitted from the engine through the gearbox to the motive power device. One form of the present invention comprises a gear reduction gearbox being designed and constructed to operate at an average pitch line velocity of 20,000 feet per minute and to withstand a maximum pitch line velocity of 40,000 feet per minute.

Figure 3:
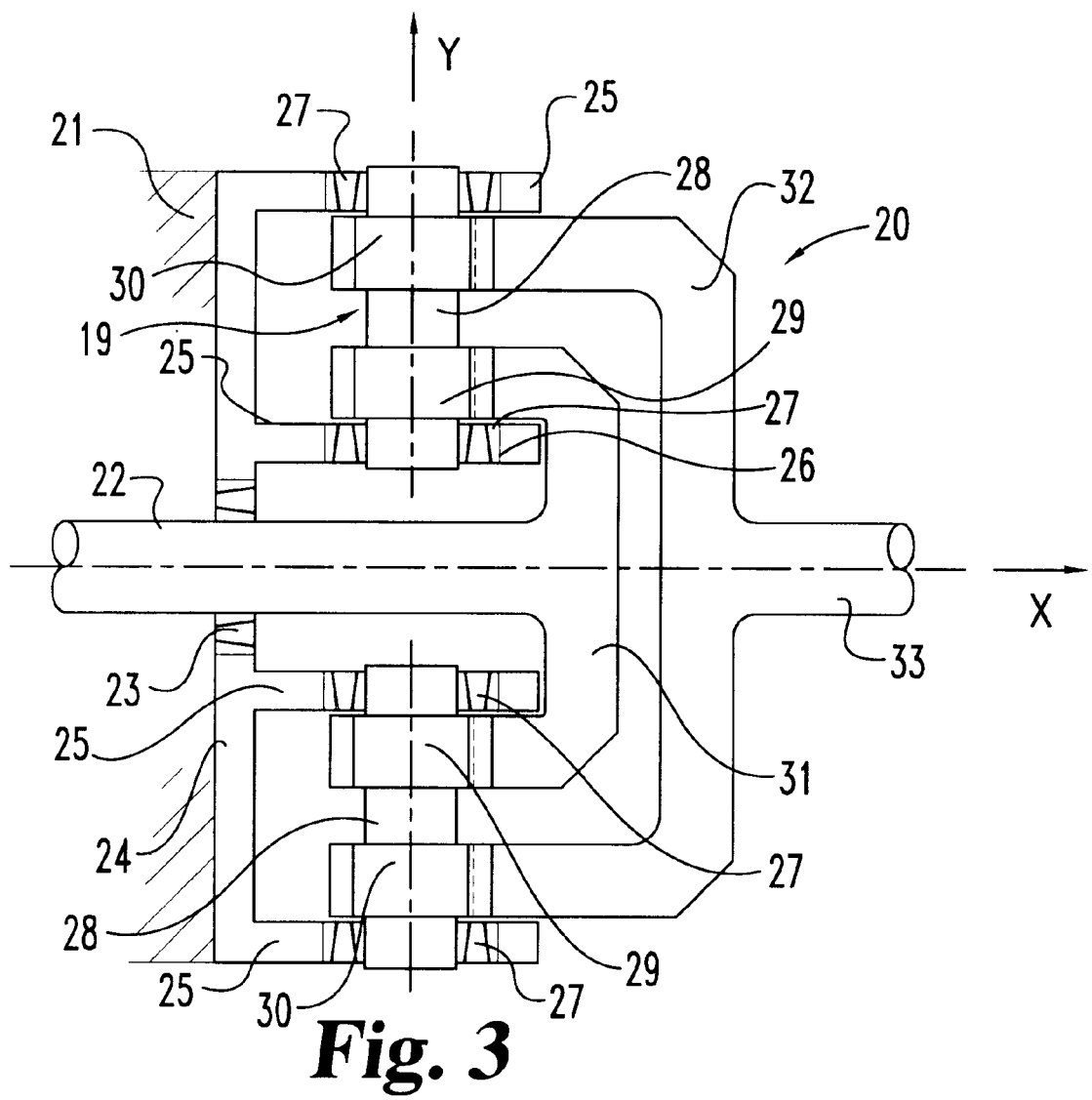
FIG. 3 is a diagrammatic view of one embodiment of a gearing arrangement comprising a portion of the FIG. 1 gear reduction gearbox.

With reference to FIG. 3, there is illustrated one embodiment of the gear reduction unit 20 of the present invention. The gear reduction unit 20 is contained within a mechanical housing 21 that forms a portion of the gear reduction gearbox 11. The mechanical housing 21 being sealed such that lubrication can be maintained therein for cooling and lubricating the components. An input shaft 22 being connected to a power output shaft of the gas turbine engine 12. The input shaft 22 is rotatably mounted to a fixed carrier 24 and is supported by a bearing 23. In the preferred embodiment the bearings 23 are oil cooled tapered roller bearings. Other bearings such as a ball and roller bearing, or fluid film bearing are contemplated herein.

In the preferred embodiment the fixed carrier 24 is connected to the mechanical housing 21 and provides mechanical structure for supporting bearing 23 and the components described hereinafter for the gear reduction unit 20. In an alternate form of the present invention fixed carrier 24 is fabricated integrally with the mechanical housing 21. In the preferred embodiment the fixed carrier 24 includes upstanding members 25 having apertures 26 therethrough for receiving a bearing 27 therein. The bearings 27 are positioned parallel to the longitudinal centerline X and a pinion shaft 28 rotates freely on the bearings. The pinion shaft 37 being located transverse to the longitudinal centerline X and extending radially outward between a pair of spaced upstanding members 25. In the preferred embodiment the bearings 27 are oil cooled tapered roller bearings. Other bearings such as a ball and roller bearing, or fluid film bearing are contemplated herein.

Fixedly attached to pinion shaft 28 and disposed within the mechanical housing is a pair of spaced pinion gears 29 and 30. Pinion gear 29 meshes with a high capacity precision face gear 31. The face gear being preferably hardened to a range of about Rockwell C 58–62. In one embodiment face gear 31 is securely connected to the power input shaft 22 of gearbox 11, and the gear being oriented transverse to the input shaft 22 and the output shaft 33. In the preferred embodiment the gear 31 is affixed to input shaft 22. Those skilled in the art understand that the interface between face gear 31 and pinion gear 29 generally requires a precision alignment in the longitudinal direction (X), however there is no requirement for precise alignment in the radial direction (Y). Therefore, the present invention eliminates conflicts in having to align both pinion gears 29 and 30 in the radial direction.

Figure 7A:
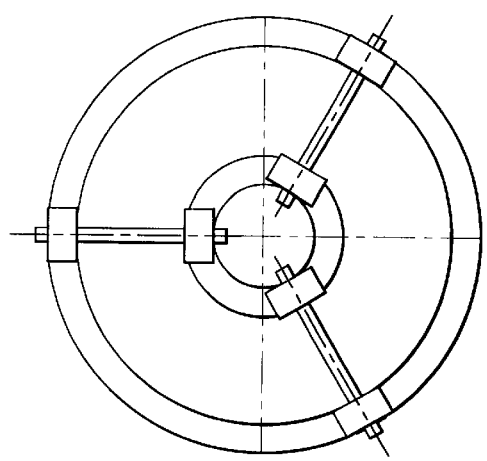
FIG. 7a is a diagrammatic end view of a gear reduction gearbox of the present invention having three pinion gear assemblies.
Figure 7B:
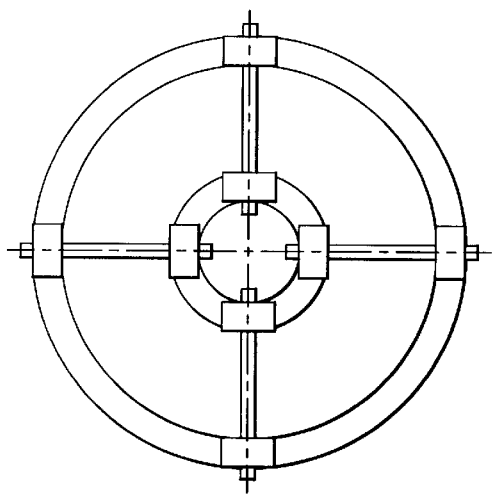
FIG. 7b is a diagrammatic end view of a gear reduction gearbox of the present invention having four pinion gear assemblies.
Figure 7C:
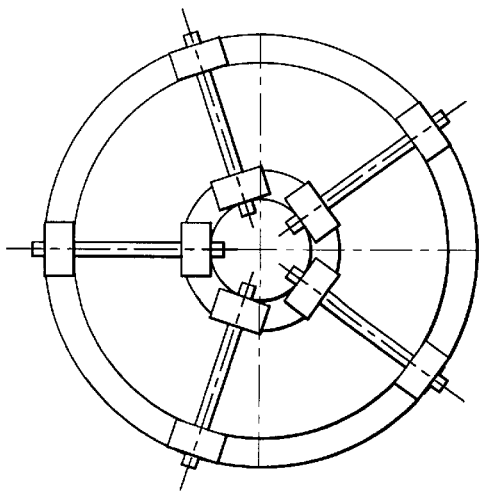
FIG. 7c is a diagrammatic end view of a gear reduction gearbox of the present invention having five pinion gear assemblies.
Figure 8:
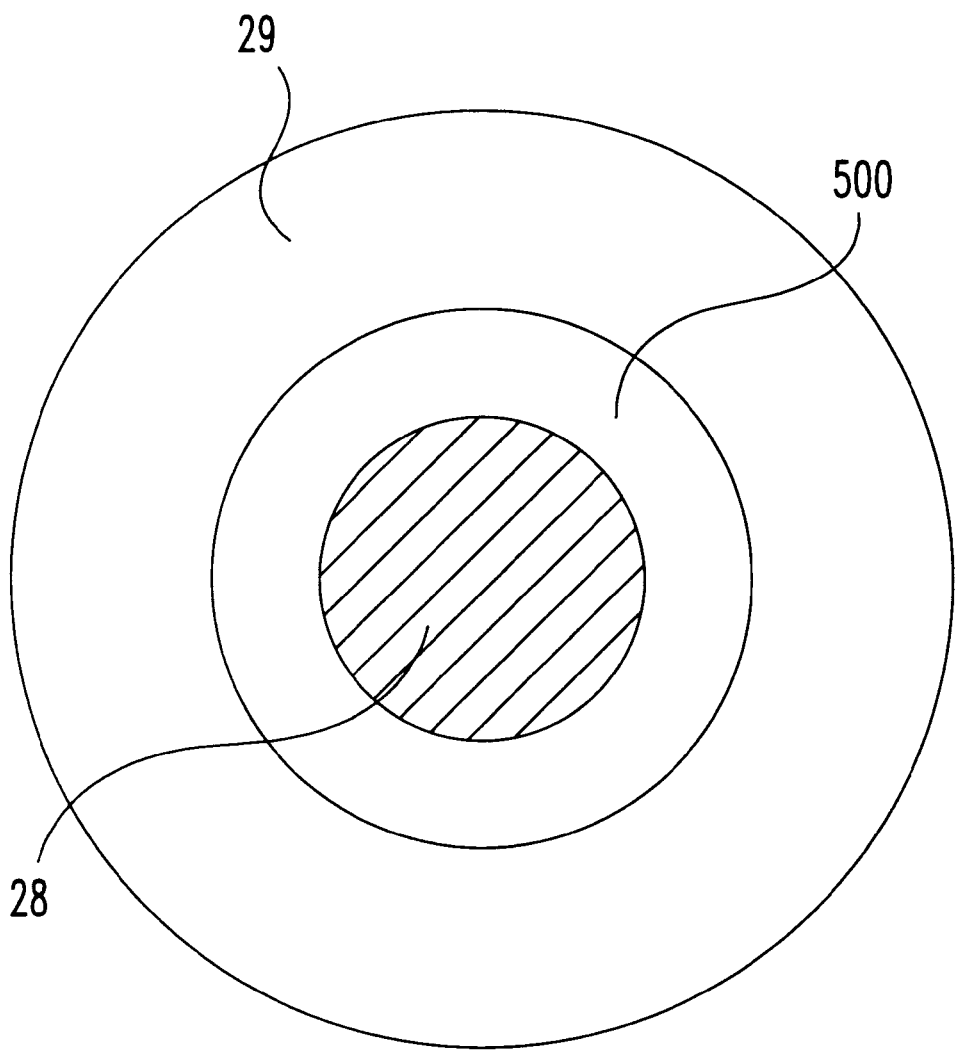
FIG. 8 is an illustrative view of a shaft and gear with an elastic damper disposed therebetween.

Pinion gear 30 being in meshing interface with a second precision high capacity face gear 32. The power transmitted by pinion shaft 28 to pinion gear 30 is utilized to drive the face gear 32 which is connected to an output shaft 33 of the gearbox 11. In the preferred embodiment the face gear 32 being affixed to the end of the output shaft 33 and oriented transverse thereto. Output shaft 33 being rotatably mounted to the mechanical housing 21 of the gearbox 11. Gear reduction unit 20 has at least one pinion shaft 28 with pinion gears 29 and 30 connected thereto and which mesh with face gears 31 and 32 respectively. In a more preferred embodiment the gear reduction unit 20 includes at least two pinion shafts 28 with pinion gears 29 and 30 connected thereto that mesh with face gears 31 and 32 respectively. In the most preferred embodiment (FIG. 7a) there are at least three equally spaced pinion shafts 28 with pinions gears 29 and 30 connected thereto and which mesh with face gears 31 and 32. In an alternative embodiment there are a plurality of pinion shafts 28 with pinion gears 29 and 30 connected thereto spaced circumferentially around the fixed carrier 24. The pinion shaft 28 with pinion gears 29 and 30 connected thereto comprise a pinion assembly 19, and the number of pinion assemblies in a drive unit 20 is preferably in the range of about 3 to 5. However, it is understood to those skilled in the art that other quantities of pinion assemblies are contemplated herein.

Gear drive unit 20 has a first gear ration which is defined by the (number of teeth in face gear 31)/(number of teeth in pinion gear 29. Face gear sets generally have a minimum gear ratio of about 2.5:1, and in the preferred embodiment the gear ratio between face gear 31 and pinion gear 29 is about 2.5:1. In drive unit 20 the gear reduction ratio between pinion gear 30 and face gear 32 is defined by the (number of teeth in pinion gear 30)/(number of teeth in face gear 32). In the preferred embodiment the gear reduction ratio is about 1:5 Face gear sets however have gear reduction ratio's in the range of about 2.5:1 to infinity:1. Other ratio's are contemplated herein for the gear ratio between face gear 32 and pinion gear 30; and the gear ratio between face gear 31 and pinion 29. A compound gear ratio is contemplated in an alternate embodiment wherein the pinion gears 29 and 30 have a different number of teeth, therefore creating a gear ratio across the pinion shaft. In the preferred embodiment the number of teeth in pinion gear 29 and pinion gear 30 is the same, therefore the gear ratio between these gears is 1:1.

In another form of the present invention the pinion shaft 28 is made of a torsionally soft material that facilitates load sharing. Further, in another form of the present invention load sharing is obtained where there are at least three equally spaced pinion assemblies 19 provided and either the input face gear 31 and/or the output face gear 32 are allowed to float in the Y direction. Furthermore, load sharing can also be accomplished by providing an elastomeric damper in either of the pinion gears or the pinion shafts.

The arrangement of the components in gear unit 20 allows for an increase in bearing size without requiring an increase in the diameter of the mechanical housing. The increase in bearing size may require an increase in the axial length of the mechanical housing, however this increase does not substantially impact the cross sectional size of the mechanical housing. The capability to utilize larger bearings within the mechanical housing independent of the gear size allows the designer to optimize the bearing and gear size. Thus giving engine designers the capability to maximize bearing size to increase the gearbox fatigue life cycle, while reducing gear size to reduce weight.

Figure 4:
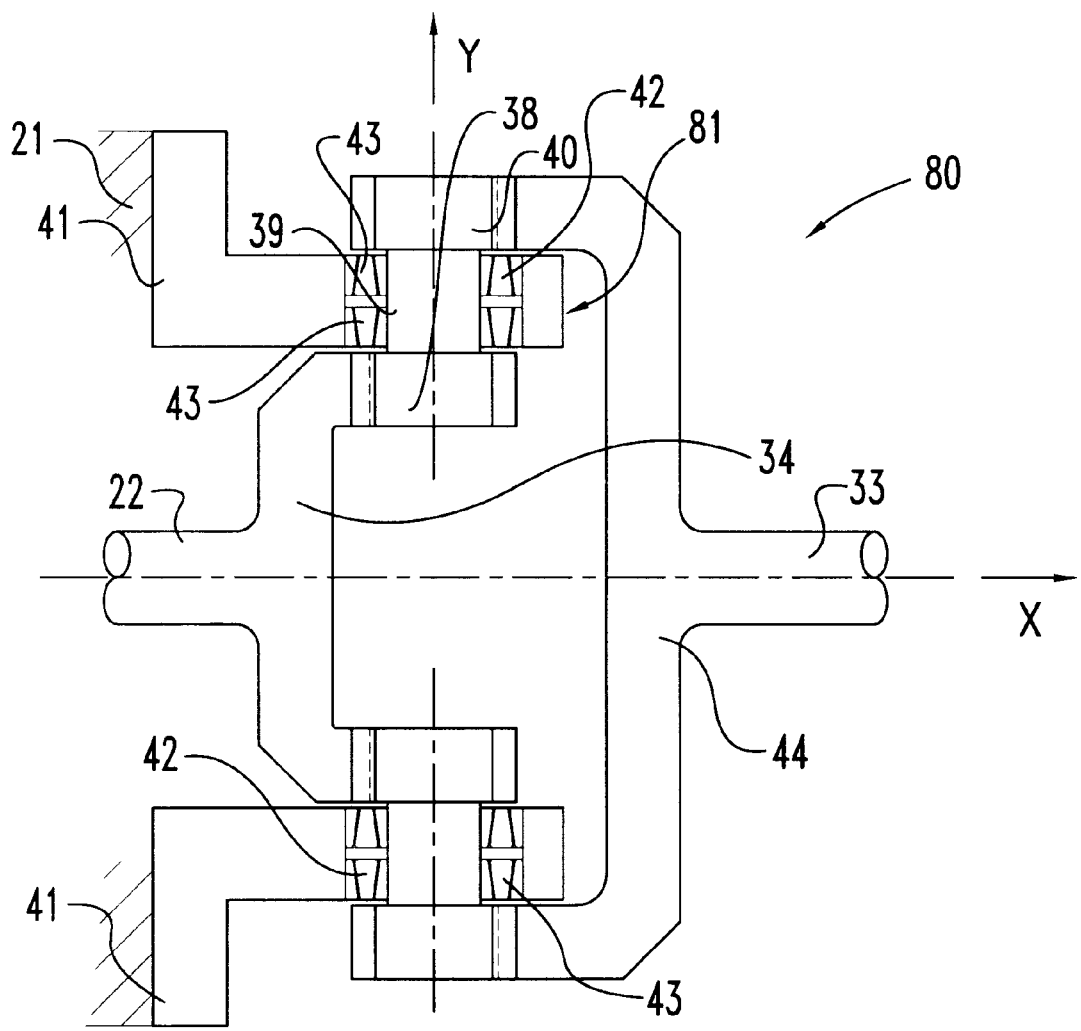
FIG. 4 is a diagrammatic view of a second embodiment of a gearing arrangement comprising a portion of the FIG. 1 gearbox.

Referring to FIG. 4, there is illustrated a second embodiment 80 of the gear reduction unit used in gearbox 11. Gear reduction unit 80 is substantially similar to gear reduction unit 20, and like figure numbers correspond to like components. Gear reduction unit 80 includes a input shaft 22 being connected to a face gear 34. Face gear 34 is attached to the input shaft 22, which is rotatably mounted to mechanical housing 21. Face gear 34 meshes with pinion gear 38 and forms a portion of pinion gear assembly 81. Pinion gear assembly 81 comprises the first pinion gear 38 that is attached to a pinion shaft 39, and a second pinion gear 40 that is attached to pinion shaft 39 and spaced from the first pinion gear 38.

A fixed carrier 41 is connected to the mechanical housing 21 and includes a plurality of apertures 42 therethrough for receiving a plurality of bearings 43. In the preferred embodiment the bearings 43 are oil cooled tapered roller bearings. Other bearings such as a ball and roller bearing, or fluid film bearing are contemplated herein. Pinion gear assembly 41 is an overhung mounted gear assembly and bearings 43 are utilized to provide rotatable support for pinion shaft 39. Second pinion gear 40 meshes with a second precision high capacity face gear 44 and the second face gear is connected to output shaft 33 of the gearbox 11. Face gears 34 and 44 are positioned substantially transverse to the input 22 and output shafts 33 and the gears are substantially parallel.

Figure 5:
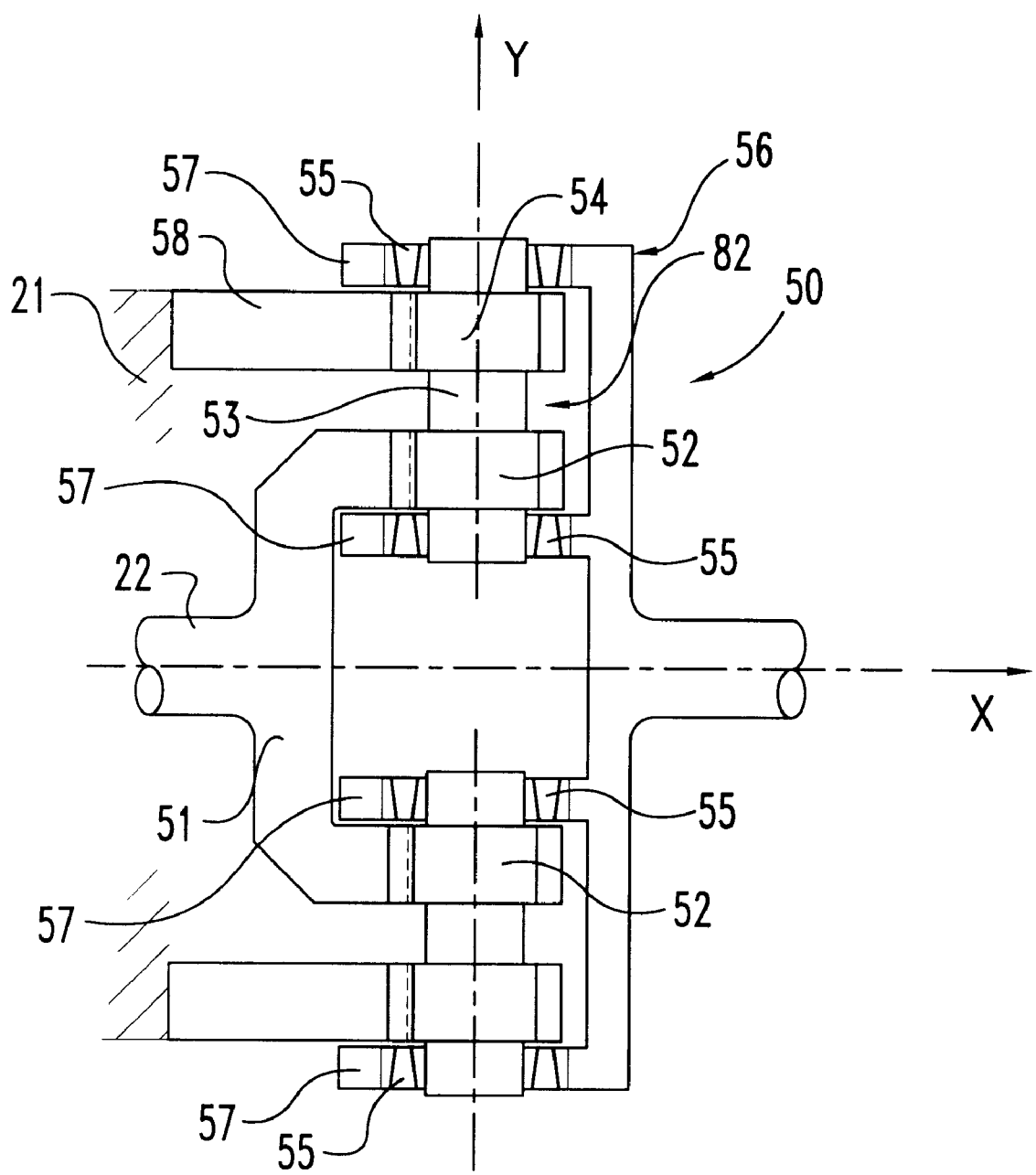
FIG. 5 is a diagrammatic view of a third embodiment of a gearing arrangement comprising a portion of the FIG. 1 gearbox.

With reference to FIG. 5, there is illustrated another embodiment 50 of the gear reduction gearbox. The gear reduction unit 50 is similar to gear reduction units 20 and 80 and like figure numbers are utilized to refer to like components. The gear reduction unit 50 includes input shaft 22 that is coupled to the output shaft 12 of the gas turbine engine. A precision high capacity face gear 51 is connected to the input shaft 22 and forms a gear set with a first pinion gear 52. Pinion gear 52 forms a portion of a pinion assembly 82 which further comprises a pinion shaft 53 and a second pinion gear 54. Pinion assembly 82 is rotatably mounted on a plurality of bearings 55 that are attached to a rotating output carrier 56.

Rotating output carrier 56 rotates about the central longitudinal axis X of the drive unit 50. In the preferred embodiment the rotating output carrier 56 includes a plurality of upstanding members 57 that container apertures therein for receiving and retaining bearings 55 therein. It is understood that in one embodiment there is a single pinion assembly 82 that revolves around the longitudinal axis. Further, a counterbalance mass (not illustrated) in integrated into the alternative embodiment to balance the single pinion assembly 82.

Gear reduction unit 50 has at least one pinion shaft 53 with pinion gears 52 and 54 meshing respectively with face gears 51 and 58. In a more preferred embodiment the gear reduction unit 50 includes at least two pinion shafts 53 with pinion gears 52 and 54 meshing with face gears 51 and 58 respectively. In the most preferred embodiment there are at least three equally spaced pinion shafts 53 with pinions gears 52 and 54 meshing with face gears 51 and 58 respectively. Further, in an alternative embodiment there are a plurality of pinion shafts 53 with pinion gears 52 and 54 connected thereto and spaced circumferentially. The pinion shaft 53 and pinion gears 51 and 58 comprise a pinion assembly 82, and the number of pinion assemblies in a drive unit 50 is preferably in the range of about 3 to 5. However, it is understood to those skilled in the art that other quantities of pinion assemblies are contemplated herein.

A fixed face gear 58 is connected to the mechanical housing 21. The face gear 58 meshes with a pinion gear 54 thereby causing the rotating output carrier 56 to revolve about the longitudinal centerline X upon the transmission of power from the gas turbine engine through input shaft 22. The rotating output carrier 56 develops a centrifugal load during the operation of the gas turbine engine. In one embodiment the centrifugal load is counteracted by a radial inward force developed by using helical pinion gears for gears 52 and 54. The helical pinion gears 52 and 54 having a different helix angle that develops an end thrust that is utilized to at least partially offset the centrifugal load associated with the rotating body. In the preferred embodiment the direction of the helix angles on the pinions (the hand) is preferably left hand for pinion gear 54 and right hand for pinion gear 52.

Figure 6:
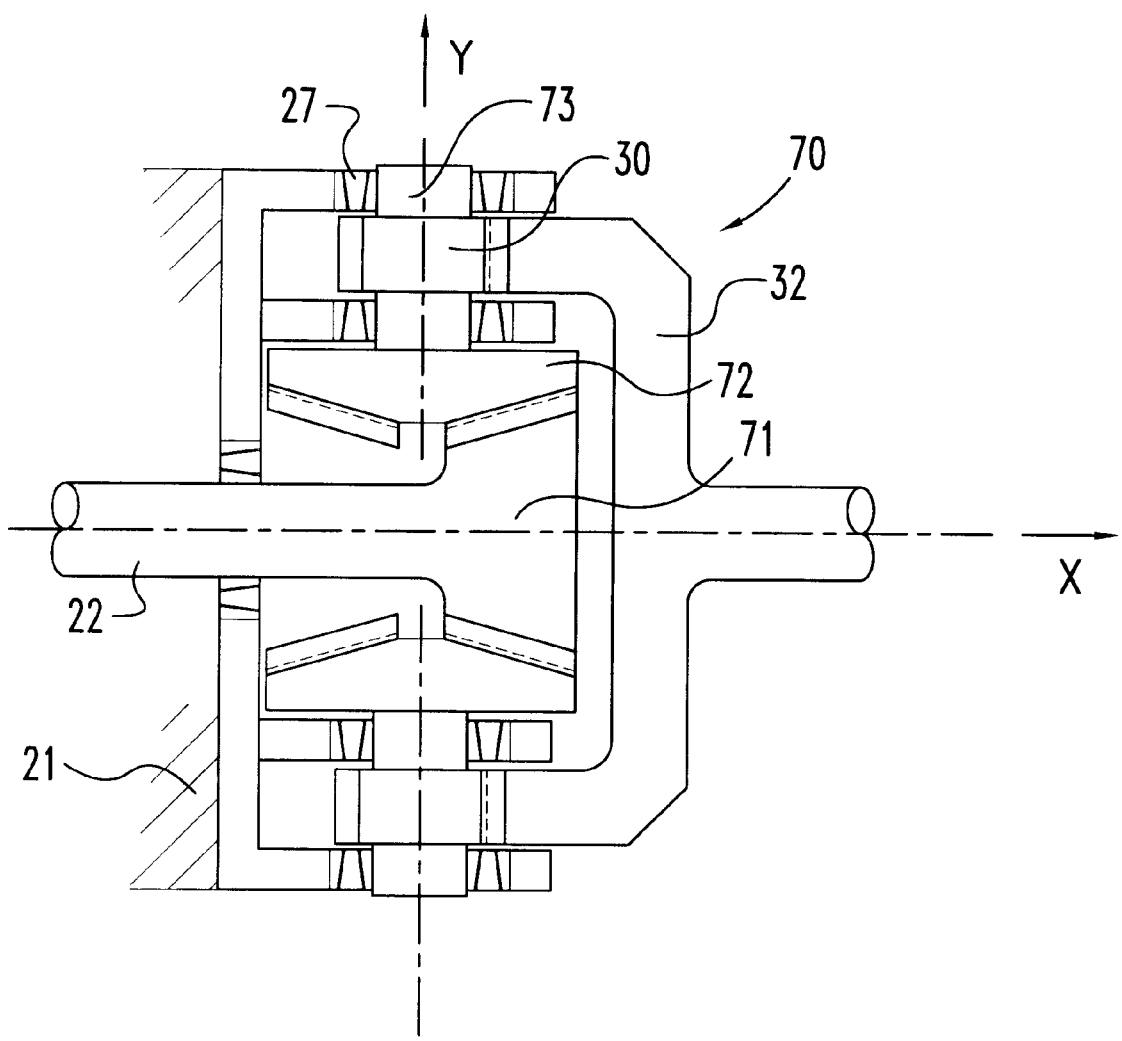
FIG. 6 is a diagrammatic view of a fourth embodiment of a gearing arrangement of the FIG. 1 gearbox comprising a combination bevel gear drive and face gear drive.

With reference to FIG. 6, there is illustrated a further embodiment 70 of the present invention. The gear reduction unit 70 is substantially similar to the gear reduction unit 20 illustrated in FIG. 3, and like figure elements represent like components. One major difference between drive unit 20 and drive unit 70 is that the first face gear 31 of drive unit 20 has been replaced with a bevel gear 71. Input shaft 22 is now connected to a bevel gear 71, however the bevel gear will require precise alignment in the X and Y direction. Bevel gear 71 meshes with a pinion gear 72 which that is mounted on a pinion shaft 73. The pinion shaft 73 has a second pinion gear 30 connected thereto which meshes with face gear 32.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
   an internal combustion engine; and
   a gearbox connected to said engine, comprising:
      a mechanical housing;
      an input shaft rotatable within said housing, said input shaft having a first longitudinal centerline;
      an output shaft rotatable within said housing, said output shaft having a second longitudinal centerline; and
      a face gear connected to and rotatable with said input shaft for changing the speed of said output shaft relative to said input shaft, said face gear positioned within said housing so as to be intersected by said first and second longitudinal centerlines and transverse to said input sand said output shafts, said face gear is a precision high capacity gear and includes a portion having a hardened surface, and wherein said face gear is permitted to float.

2. The combination of claim 1, which further comprises a plurality of pinion gear assemblies integrating with said face gear and which further comprises a rotating pinion gear carrier for supporting said pinion gear assemblies.

3. The combination of claim 1:
   wherein said internal combustion engine defines a gas turbine engine;
   wherein said output shaft provides power to a motive power device for facilitating propulsion of an aircraft;
   wherein said face gear is capable of operating at an average pitchline velocity of about 20,000 feet per minute; and
   further comprising a pinion gear assembly interengaging with said face gear.

4. The combination of claim 1, wherein said portion is hardened to about Rockwell "C" 58, and wherein said gearbox transmitting at least fifty horsepower through said output shaft.

5. The combination of claim 4, wherein said face gear has a surface finished by skiving.

6. The combination of claim 1, wherein said face gear is capable of operating at an average pitchline velocity of about 20,000 feet per minute.

7. The combination of claim 1, wherein said face gear is operable at a pitchline velocity of about 40,000 feet per minute.

8. The combination of claim 1, further comprising a pinion gear assembly interengaging with said face gear.

9. The combination of claim 8, wherein said pinion gear assembly includes a shaft and a pair of gears and wherein said shaft is torsionally soft.

10. The combination of claim 8, wherein said pinion gear assembly includes a shaft and a pair of gears and wherein said pinion gear assembly includes an elastomeric damper.

11. The combination of claim 1, wherein said internal combustion engine defines a gas turbine engine, and wherein said output shaft provides power to a motive power device for facilitating propulsion of an aircraft.

12. The combination of claim 11, wherein said motive power device is a propeller, and wherein said propeller rotational speed is less than one eighth of said input shaft speed.

13. In combination:
   an internal combustion engine; and
   a gearbox connecting to said engine, comprising:
      a mechanical housing;
      an input shaft rotatable within said housing and coupled to said internal combustion engine;
      a first face gear rotatable within said housing and connected to said input shaft;
      a second face gear fixedly mounted within said housing; and
      a plurality of pinion gear assemblies interengaging with said face gears, each of said pinion gear assemblies including a rotatable shaft and a pair of gears, one of said gears coupled to each end of said shaft, at least one of said plurality of pinion gear assemblies is a floating pinion gear assembly connecting between said first face gear and said second face gear.

14. The combination of claim 13, wherein at least one of said plurality of pinion gear assemblies includes teeth with a right hand helix on one of said pair of gears and teeth with a left hand helix on the other of said pair of gears.

15. The combination of claim 13, wherein said pair of gears have a different numbers of teeth.

16. The combination of claim 13, wherein one of said pinion gear assemblies includes an elastomeric damper.

17. The combination of claim 13, wherein said first face gear has a diameter smaller than the diameter of said second face gear.

18. The combination of claim 13, which further includes a pair of bearings for supporting each of said pinion gear assemblies, wherein said pair of bearings are not located between said pinion gears.

19. The combination of claim 13, wherein one of said face gears is permitted to float.

20. The combination of claim 13, wherein said internal combustion engine is a gas turbine engine for an aircraft, and further comprising a propeller, wherein said first face gear transmits power to said propeller.

21. The combination of claim 13:
   wherein said internal combustion engine is a gas turbine engine adapted for use in an aircraft; and
   wherein said face gears are precision high capacity gears and have a surface portion that is hardened.

22. The combination of claim 13, wherein at least one of said face gears is a precision high capacity gear having a portion that is hardened.

23. The combination of claim 22, wherein said portion includes an outer surface that is hardened to at least Rockwell "C" 58.

24. The combination of claim 22, wherein at least one of said face gears is capable of operating at a pitchline velocity of about 40,000 feet per minute.

25. The combination of claim 13, wherein said face gears are precision high capacity gears and have a surface portion that is hardened.

26. The combination of claim 25, wherein at least one of said face gears is finished by skiving.

27. The combination of claim 13, wherein said shaft of at least one of said pinion gear assemblies is soft.

28. The combination of claim 27, wherein said shaft is torsionally soft.

29. The combination of claim 13, which further comprises a rotating pinion gear carrier for supporting said pinion gear assemblies.

30. The combination of claim 29, wherein said first face gear and said carrier rotate about the same axis.

31. In combination:
an internal combustion engine; and
a gearbox connecting to said engine for receiving a load from said engine, comprising:
   a mechanical housing;
   a pair of spaced face gears within said housing, each of said face gears having a face including ear teeth, and wherein said faces are substantially parallel; and
   a plurality of pinion gear sets connecting between said pair of face gears, at least one of said plurality of pinion gear sets comprising a shaft with a first helical gear and a second helical gear connected thereto, said first gear meshing with said gear teeth of one of said pair of face gears and said second gear meshing with said gear teeth of the other of said pair of face gears, wherein said first gear and said second gear have a different hand.

32. The combination of claim 31, wherein said pair of face gears are precision high capacity gears, each of said gears having a surface hardened portion.

33. The combination of claim 31, wherein at least one of said pinion gear sets includes a torsionally soft shaft for load sharing.

34. The combination of claim 31, wherein at least one of said pinion gear sets includes an elastomeric damper for load sharing.

35. The combination of claim 31, wherein said internal combustion engine is a gas turbine engine, and further comprising a propeller, wherein one of said pair of face gears provides power to said propeller.

36. The combination of claim 31, wherein said plurality of pinion gear sets includes at least three pinion gear sets coupled between said pair of face gears, and wherein each of said at least three pinion gear sets have said first helical gear spaced from said second helical gear, and in each of said plurality of pinion gear sets said first gear and said second gear have a different hand.

37. The combination of claim 31, wherein at least one of said plurality of pinion gear sets including a first helical gear and a spaced second helical gear, the teeth of said first gear and said second gear having a different hand.

38. The combination of claim 31, wherein at least one of said pair of face gears is a precision high capacity gear having a hardened portion.

39. The combination of claim 38, wherein said portion is hardened to at least Rockwell "C" 58.

40. The combination of claim 38, wherein at least one of said face gears is finished by skiving.

41. The combination of claim 38, wherein said plurality of pinion gear sets is defined by at least three pinion gear sets.

42. The combination of claim 41, which further comprises a rotating pinion gear carrier for supporting said pinion gear sets.

43. The combination of claim 41, which further comprises a fixed pinion gear carrier for supporting said pinion gear sets.

44. In combination:
an internal combustion engine; and
a gearbox connected to said engine, comprising:
   a mechanical housing;
   an input shaft rotatable within said housing, said input shaft having a first longitudinal centerline;
   an output shaft rotatable within said housing, said output shaft having a second longitudinal centerline;
   a first face gear positioned within said mechanical housing and connected to and rotatable with said input shaft;
   a second face gear positioned within said mechanical housing; and
   at least three pinion gear assemblies positioned within said housing and interengaging with said first face gear and said second face gear, wherein each of said at least three pinion gear assemblies has a pair of gears coupled to a torsionally soft shaft.

45. The combination of claim 44, which further comprises a rotating pinion gear carrier for supporting said pinion gear assemblies.

46. The combination of claim 44, which further comprises a stationary pinion gear carrier for supporting said pinion gear assemblies.

47. The combination of claim 44, wherein at least one of said face gears is a precision high capacity gear having a surface portion that is hardened.

48. The combination of claim 47, wherein said surface portion is hardened to at least Rockwell "C" 58 and has been finished by skiving.

49. The combination of claim 48, wherein said face gear is capable of operating at a pitchline velocity of about 40,000 feet per minute.

50. In combination:
a gas turbine engine having a fan adapted to facilitate propulsion of an aircraft; and
a gearbox connecting to said engine, comprising:
   a mechanical housing:
   a first face gear rotatable within said housing for providing power to said fan;
   a second face gear fixedly mounted within said housing; and
   a floating pinion gear assembly connecting between said first face gear and said second face gear.

51. In combination:
an internal combustion engine; and
a gearbox connected to said engine, comprising:
   a mechanical housing;
   an input shaft rotatable within said housing, said input shaft having a first longitudinal centerline;
   an output shaft rotatable within said housing, said output shaft having a second longitudinal centerline;
   a face gear for changing the speed of said output shaft relative to said input shaft, said face gear positioned within said housing so as to be intersected by one of said first and second longitudinal centerlines and transverse to said input and said output shafts; and
   a plurality of pinion gear assemblies interengaging with said face gear, each of said plurality of pinion gear assemblies including a first gear and a second gear spaced therefrom, said first gear interengaging with said face gear, and wherein one of said first and said second gears having a right hand helix and the other having a left hand helix for developing an end thrust to partially offset the centrifugal load associated with rotating members.

52. In combination:

an internal combustion engine; and a gearbox connected to said engine, comprising:
  a mechanical housing;
  an input shaft rotatable within said housing, said input shaft having a first longitudinal centerline;
  an output shaft rotatable within said housing, said output shaft having a second longitudinal centerline;
  a precision high capacity face gear including a portion having a hardened surface for changing the speed of said output shaft relative to said input shaft, said face gear positioned within said housing so as to be intersected by one said first and second longitudinal centerlines and transverse to said input and said output shafts; and
  a plurality of pinion gear assemblies meshing with said face gear, each of said plurality of pinion gear assemblies having a shaft with a first gear and second gear coupled thereto, and wherein each of said pinion gear assemblies including an elastomeric damper.

53. In combination:

a gas turbine engine having a fan adapted to facilitate propulsion of an aircraft; and a gearbox connecting to said engine for receiving a load from said engine, comprising:
  a mechanical housing;
  a pair of spaced face gears within said housing, each of said face gears including gear teeth, one of said pair of face gears adapted for transmitting power to said fan; and
  a plurality of pinion gear sets connecting between said pair of face gears and contacting said teeth of each of said pair of gears for sharing the load from said engine.

54. In combination:

an internal combustion engine; and a gearbox connecting to said engine for receiving a load from said engine, comprising:
  a mechanical housing;
  a pair of spaced face gears within said housing, each of said face gears having a face including gear teeth, and wherein said faces are substantially parallel, and, at least one of said pair of face gears is a precision high capacity gear having a hardened portion; and
  at least three pinion gear sets coupled between said pair of face gears, each of said at least three pinion gear sets comprising a shaft with a first gear and a second gear connected thereto, said first gear meshing with said gear teeth of one of said pair of face gears and said second gear meshing with said gear teeth of the other of said pair of face gears, wherein said first gear and said second gear have a different helix angle to develop a load to partially offset centrifugal loading associated with rotating bodies.

55. The combination of claim 54, wherein at least one of said face gears is finished by skiving.

56. The combination of claim 54, wherein said face gears are operable at an average pitch line velocity of 20,000 feet per minute.

57. The combination of claim 54, wherein said plurality of pinion gear sets is defined by at least three pinion gear sets.

58. The combination of claim 54, wherein at least one of said pinion gear sets includes a torsionally soft shaft for load sharing.

59. The combination of claim 54, wherein said internal combustion engine is a gas turbine engine, and further comprising a propeller, wherein one of said pair of face gears provides power to said propeller.

60. The combination of claim 54, wherein said internal combustion engine is a gas turbine engine, and further comprising a fan, wherein one of said face gears provides power to said fan.

61. The combination of claim 54, wherein said portion is hardened to at least Rockwell "C" 58.

62. The combination of claim 61, wherein both of said pair of face gears are precision high capacity gears, each of said gears having a surface hardened portion.

63. The combination of claim 62, wherein said face gears are operable at a pitchline velocity of about 40,000 feet per minute.

64. In combination:

an internal combustion engine; and a gearbox connecting to said engine for receiving a load form said engine, comprising:
  a mechanical housing;
  a pair of spaced face gears within said housing, each of said face gears having a face including gear teeth, and wherein said faces are substantially parallel; and
  a plurality of pinion gear sets connecting between said pair of face gears, each of said plurality of pinion gear sets comprising a shaft with a first gear and a second gear connected thereto, said first gear meshing with said gear teeth of one of said pair of face gears and said second gear meshing with said gear teeth of the other of said pair of face gears, and wherein at least one of said pinion gear sets includes an elastomeric damper for load sharing.

65. The combination of claim 64, wherein at least one of said pair of face gears is a precision high capacity gear having a hardened portion.

66. The combination of claim 64, wherein said first gear has teeth and said second gear has teeth, and wherein the teeth of said first gear and said second gear have a different hand.

67. The combination of claim 64, wherein said internal combustion engine is a gas turbine engine, and further comprising a fan, wherein one of said face gears provides power to said fan.

68. The combination of claim 64, wherein said pair of face gears are precision high capacity gears, each of said gears having a surface hardened portion.

69. The combination of claim 68, wherein each of said pair of face gears are operable at an average pitch line velocity of 20,000 feet per minute.

70. The combination of claim 68, wherein each of said pair of face gears are operable at a pitchline velocity of about 40,000 feet per minute.

71. In combination:

an internal combustion engine; and a gearbox connecting to said engine for receiving a load from said engine, comprising:
  a mechanical housing;
  a pair of spaced face gears within said housing, each of said face gears having a face including gear teeth, and at least one of said pair of face gears is a precision high capacity gear having a hardened portion and said faces are substantially parallel, and wherein at least one of said face gears is permitted to float; and a plurality of pinion gear sets connecting between said pair of face gears, each of said plurality of pinion gear sets comprising a shaft with a first gear and a second gear connected thereto, said first gear meshing with said gear teeth of one of said pair of face gears and said second gear meshing with said gear teeth of the other of said pair of face gears.

72. The combination of claim 71, wherein said portion is hardened to at least Rockwell "C" 58.

73. The combination of claim 71, wherein at least one of said face gears is finished by skiving.

74. The combination of claim 71, wherein said face gears are operable at an average pitch line velocity of 20,000 feet per minute.

75. The combination of claim 71, wherein said plurality of pinion gear sets is defined by at least three pinion gear sets.

76. The combination of claim 71, wherein at least one of said pinion gear sets includes a torsionally soft shaft for load sharing.

77. The combination of claim 71, wherein at least one of said pinion gear sets includes an elastomeric damper for load sharing.

78. The combination of claim 71, wherein said internal combustion engine is a gas turbine engine, and further comprising a propeller, wherein one of said pair of face gears provides power to said propeller.

79. The combination of claim 71, wherein said internal combustion engine is a gas turbine engine, and further comprising a fan, wherein one of said face gears provides power to said fan.

80. In combination:

an internal combustion engine; and a gearbox connected to said engine, comprising:
  a mechanical housing;
  an input shaft rotatable within said housing, said input shaft having a first longitudinal centerline;
  an output shaft rotatable within said housing, said output shaft having a second longitudinal centerline;
  a first face gear positioned within said mechanical housing and connected to and rotatable with said input shaft;
  a second face gear positioned within said mechanical housing; and
  at least three pinion gear assemblies positioned within said housing and interengaging with said first face gear and said second face gear, wherein each of said at least three pinion gear assemblies has a pair of gears coupled to shaft, and wherein at least one of said pinion gear assemblies includes an elastomeric damper.

81. The combination of claim 80, wherein at least one of said face gear is a precision high capacity gear having a surface portion that is hardened.

82. The combination of claim 81, wherein said surface portion is hardened to at least Rockwell "C" 58 and has been finished by skiving.

83. The combination of claim 82, wherein said at least one of said face gears is capable of operating at a pitchline velocity of about 40,000 feet per minute.

84. In combination:

a gas turbine engine having a fan adapted to facilitate propulsion of an aircraft; and a gearbox connected to said engine, comprising:
  a mechanical housing;
  an input shaft rotatable within said housing, said input shaft having a first longitudinal centerline;
  an output shaft rotatable within said housing and coupled to said fan to rotate said fan at an output speed that is less than one fourth of said input shaft speed, said output shaft having a second longitudinal centerline; and
  a face gear connected to and rotatable with said input shaft for changing the speed of said output shaft relative to said input shaft, said face gear positioned within said housing so as to be intersected by said first and second longitudinal centerlines and transverse to said input and said output shafts.

85. The combination of claim 84, wherein said face gear is a precision high capacity gear, and said face gear includes a portion having a hardened surface.

86. The combination of claim 85, wherein said face gear is capable of operating at an average pitchline velocity of about 20,000 feet per minute.

87. The combination of claim 84, which further includes a plurality of pinion gear assemblies interengaging with said face gear, each of said pinion gear assemblies having a shaft and a first and second gear coupled to said shaft.

88. The combination of claim 87, wherein said shaft is torsionally soft.

89. The combination of claim 87, wherein at least one of said pinion gear assemblies includes an elastomeric damper.

* * * * *